3,841,939
METHOD OF BONDING URETHANE ELASTOMERS

Basil P. Gray, Negley, Ohio, assignor to
Commercial Shearing, Inc.
No Drawing. Filed Jan. 12, 1973, Ser. No. 323,103
Int. Cl. C09j 5/00; B32b 27/40, 27/38
U.S. Cl. 156—330                                    8 Claims

ABSTRACT OF THE DISCLOSURE

Gaskets and the like of urethane elastomer which incorporates an aniline derivative are bonded by coating their abutting surfaces with a dilute aqueous solution of a high molecular weight polyethylene oxide resin, bringing the surfaces together and holding them together under pressure. Damaged gaskets are repaired by coating their surfaces with the solution above mentioned and applying thereto uncured elastomer.

---

This invention relates to the bonding of gaskets or other surfaces of urethane elastomers. It is more particularly concerned with a method of pressure bonding such surfaces involving the application of an aqueous solution of a resin thereto.

Urethane elastomer polymers are in many respects well suited for gaskets or sealants for abutting surfaces. They can be applied to the abutting surfaces as a machine-mixed two-component blend, and cure rapidly to a strong resilient elastomer which is inert to most chemicals. However, fully cured urethane elastomers are so inert that gaskets made of them will not bond or weld to each other, even under pressure, and fresh, uncured urethane will not adhere to cured material. Thus, prior to my invention to be described, gaskets or other surfaces of urethanes could not be bonded to each other, and damaged gaskets or other surfaces of those materials could not be repaired.

When urethanes cure, they become tightly cross-linked, and any free isocyanate groups react with moisture in the air and become inert. It would seem that adhesion between fresh, or uncured and cured urethane material could be promoted by using an excess amount of polyol in the cured material, which would remain unreacted until it was contacted by the isocyanate of the uncured material. I have found that a certain degree of adhesion between fresh and cured material can be achieved by incorporating in the urethane a crude phenolic by-product of the naval stores industry sold under the trade name "Vinsol." However, the physical properties of gasket material so modified were degraded.

Solvent welding is useful for bonding many plastics. As has been mentioned, however, urethanes in general are so inert that they are not dissolved by solvents. It will also be apparent that in many circumstances the use of organic solvents is undesirable because of the nature of their evaporation products. Furthermore, organic solvents cannot be successfully applied to surfaces which are wet with water.

Adhesive bonding is likewise not feasible. Organic solvents are undesirable for the reasons above mentioned. Water-based adhesives do not dry between two impermeable surfaces under conditions of high humidity. Pressure-sensitive adhesives, because of their instantaneous "grab," do not permit the abutting surfaces to be aligned, and their tacky surfaces are easily contaminated by water and dirt. The 100% solid epoxy urethane and acrylic adhesives develop adequate bond strength. However, they must be applied as a liquid to the surfaces to be bonded, and are difficult to use under wet, dirty conditions.

It is an object of my invention, therefore, to provide a method of bonding high durometer urethane gaskets and the like which can be readily carried out under unfavorable conditions. It is another object to provide such a method for repairing damaged gaskets with freshly mixed uncured urethane materials. Other objects of my invention will appear in the course of the description thereof which follows.

I have discovered that urethane polymers which incorporate aniline derivatives can be pressure-bonded or welded if one or both of their abutting surfaces are coated with a dilute aqueous solution of a polyethylene oxide resin. My method comprehends applying such a solution to gaskets or other solid bodies of aniline derivative-containing urethane, bringing the coated surfaces together, and holding them together under pressure.

Many urethane known to the prior art contain aniline derivatives for other purposes. Hydropropyl aniline is a reinforcing or cross-linking agent which is used to reduce the deformation and cold flow of elastomers, and it is an aniline derivative well suited for my process. The ethylene oxide polymers I prefer to use are polyethylene oxide homopolymers ranging in molecular weight from several hundred thousand to over five million. I denominate those polymers high molecular weight polymers. I find that the very high weight polymers are most effective and prefer to use such a polymer having such a molecular weight of four million which is sold by Union Carbide Corporation under the trade designation WSR 301.

I prepare a 1% aqueous solution of this resin by weight and apply it by brushing or spraying to the contact surfaces of aniline derivative-containing urethane gaskets. The amount applied is not critical. The solution is compatible with water and can be applied directly to wet surfaces as well as dry surfaces. Loose dirt can be removed in the same operation. The gaskets can be brought into contact and pressure applied while the resin solution is wet or it may be allowed to dry to moist condition. The coating has a lubricating effect on the gaskets which facilitates their assembly. The pressure on the gaskets should be maintained for a time depending on the magnitude of the pressure. Gaskets in pipe joints, of course, are usually under permanent pressure of considerable magnitude. If the pressure is 200 lbs. per sq. inch, for example, it should be maintained for about 24 hours, but if it can be raised to 2,000 lbs. per sq. inch without causing the urethane to extrude bonding takes place in 2 to 3 hours. The surfaces of the urethane in contact with each other weld together to a homogenous mass.

Damaged gaskets and other solid bodies of aniline derivative-containing urethane are repaired by coating the surface of the damaged portion with the aqueous solution of a polyethylene resin as above mentioned, and allowing it to dry. Then freshly mixed uncured aniline derivative-containing urethane is applied to the coated surface and adheres thereto, developing a strong bond. Aging of the coated elastomer to the extent of three days at 100° C. has no adverse effect on the bonding of the coated surface with fresh urethane.

I have successfully carried out my bonding process herein described with various types of aniline-containing urethanes of conventional polyether or polyester diisocyanate composition. I find that it also bonds an aniline-containing urethane type polymer which is the reaction product of a hydroxy terminated liquid polybutadiene polymer or copolymer and a polyfunctional isocyanate, and I include such polymers as urethanes herein. A typical composition of such a polymer in parts by weight is:

Hydroxy terminated liquid polybutadiene resin ____ 100.0
N-N bis (2 hydroxy propyl) aniline _____ 16.8
Dibutyl tin dilaurate _____ 0.02
Diphenyl methane di-iso cyanate _____ 34.5

Aqueous solutions of high molecular weight ethylene polymers become increasingly viscous and sticky as their molecular weight increases. A 1% solution by weight of WSR 301 polymer is useable but higher molecular weight polymers must be diluted further to render them applicable evenly to the elastomer surfaces, and because of this their bonding strength falls off. The lower weight polymers form somewhat weaker bonds in the dilute solution I prefer to use. The bond strength is increased by increasing their concentration but this, of course, is not economical.

I do not know why my method is effective. It is known that ethylene oxide polymers form strong complexes with a considerable number of other materials such as ureas, polyacrylic acid, iodine and iodides, phenols, phenolic resins, mineral acids, halogens, asphalts, lignin sulfonic acids, mercuric salts, polymeric acids including carbonyl derivatives of cellulose, silicones, and many natural and synthetic organic polymers and copolymers. It is possible that the ethylene oxide polymers I employ form such association complexes with the aniline derivative in the urethane.

In the foregoing specification I have described a presently preferred embodiment of this invention, however, it will be understood that this invention can be otherwise embodied within the scope of the following claims.

I claim:

1. The method of pressure-bonding together bodies of urethane elastomers incorporating an aniline derivative comprising applying to at least one of the bonding surfaces a dilute aqueous solution of polyethylene oxide resin having a molecular weight of at least several hundred thousand, and holding the bonding surfaces together under pressure.

2. The method of claim 1 in which the aniline derivative is hydroxy propyl aniline.

3. The method of claim 1 in which the polyethylene oxide has a molecular weight of about four million or more.

4. The method of claim 1 in which the dilute aqueous solution is about a 1% aqueous solution by weight.

5. The method of bonding an uncured urethane elastomer incorporating an aniline derivative to a cured surface of a urethane elastomer incorporating an aniline derivative comprising applying to the cured surface a dilute aqueous solution of polyethylene oxide resin, having a molecular weight of at least several hundred thousand, drying the solution on the cured surface, and applying the uncured elastomer thereto.

6. The method of claim 5 in which the polyethylene oxide resin has a molecular weight of about four million or more.

7. The method of claim 5 in which the dilute aqueous solution is about 1% aqueous solution by weight.

8. The method of claim 5 in which the aniline derivative is hydroxy propyl aniline.

References Cited

UNITED STATES PATENTS

| | | | |
|---|---|---|---|
| 3,042,545 | 7/1962 | Kienle et al. | 117—75 |
| 3,193,441 | 7/1965 | Schafer | 161—159 |
| 3,227,603 | 1/1966 | Kraiman | 161—160 |
| 3,352,955 | 11/1967 | Pigott et al. | 264—135 |
| 3,378,497 | 4/1968 | Lanham | 252—182 |
| 3,501,564 | 3/1970 | Snoeyenbos et al. | 264—255 |
| 3,634,305 | 1/1972 | Johnson et al. | 260—33.4 R |
| 3,645,950 | 2/1972 | Stratta | 260—29.2 EP |

CHARLES E. VAN HORN, Primary Examiner

R. A. DAWSON, Assistant Examiner

U.S. Cl. X.R.

161—184, 190; 260—29.2 EP, 830 R